(12) United States Patent
Devendrappa et al.

(10) Patent No.: US 9,891,833 B2
(45) Date of Patent: Feb. 13, 2018

(54) ELIMINATING GARBAGE COLLECTION IN NAND FLASH DEVICES

(71) Applicant: HoneycombData Inc., Santa Clara, CA (US)

(72) Inventors: Sushma Devendrappa, San Jose, CA (US); Xiangyong Ouyang, South San Francisco, CA (US); Jongman Yoon, San Jose, CA (US)

(73) Assignee: HONEYCOMBDATA INC., Santa Clara, CA (US)

( * ) Notice: Subject to any disclaimer, the term of this patent is extended or adjusted under 35 U.S.C. 154(b) by 73 days.

(21) Appl. No.: 14/920,617

(22) Filed: Oct. 22, 2015

(65) Prior Publication Data

US 2017/0115890 A1   Apr. 27, 2017

(51) Int. Cl.
*G06F 12/00* (2006.01)
*G06F 3/06* (2006.01)

(52) U.S. Cl.
CPC ............ *G06F 3/0608* (2013.01); *G06F 3/064* (2013.01); *G06F 3/0659* (2013.01); *G06F 3/0679* (2013.01)

(58) Field of Classification Search
CPC ...... G06F 3/0659; G06F 3/064; G06F 3/0608; G06F 3/0679
See application file for complete search history.

(56) References Cited

U.S. PATENT DOCUMENTS

| | | |
|---|---|---|
| 8,433,981 B1 | 4/2013 | Agarwal |
| 8,489,855 B2 | 7/2013 | Schuette |
| 8,769,191 B2 | 7/2014 | Yun |
| 2005/0141312 A1* | 6/2005 | Sinclair ............... G06F 11/1072 365/222 |
| 2007/0113029 A1 | 5/2007 | Bennett |
| 2008/0155301 A1 | 6/2008 | Ahvenainen |
| 2011/0119462 A1 | 5/2011 | Leach |
| 2011/0161560 A1 | 6/2011 | Hutchison et al. |
| 2011/0276746 A1* | 11/2011 | Pruthi ................. G06F 12/0866 711/103 |
| 2013/0019057 A1 | 1/2013 | Stephens |
| 2013/0111298 A1* | 5/2013 | Seroff ................... G06F 3/0614 714/758 |
| 2013/0159613 A1 | 6/2013 | Luukkainen |

* cited by examiner

*Primary Examiner* — Larry T Mackall
(74) *Attorney, Agent, or Firm* — David R. Stevens; Stevens Law Group

(57) ABSTRACT

A storage device, such as a NAND flash device, avoids the need for garbage collection. An application executing on a host system tracks data objects that are marked as invalid and maintains an association between data objects and logical blocks, each logical block corresponding to a physical block of memory in the NAND flash device. Upon determining that the logical block contains no valid objects, the application instructs an SSD to trim the physical block of memory corresponding to the logical block. The application also aggregates write commands until a full block of data is ready to be written, at which point the application transmits a write command to the SSD.

18 Claims, 6 Drawing Sheets

ELIMINATING GARBAGE COLLECTION IN NAND FLASH DEVICES

BACKGROUND

Field of the Invention

This invention relates to systems and methods for storing and accessing data in a flash memory system.

Background of the Invention

Typically flash memory includes many data blocks (a smallest erasable unit). Each data block includes several data pages (a smallest programmable unit). Read and write operations may be performed at page level. Erase operations are only performed at block level. Due to internal characteristic of flash memory, a flash page cannot be overwritten. It needs to be erased prior to program operation. Because erase operation is very time intensive (it is a block level operation) and also reduces the flash block lifetime (each flash block is associated with fixed number of erase cycle), flash vendors often perform flash page overwrite operation as 1) write a new flash page, 2) invalidate an old flash page.

This leads to many versions of same page, all these versions except the recent version of the page is invalid once the data is modified. Several invalid copies of the same page will increase device space consumption, which leads to increase in write amplification (WA).

Blocks with many invalid pages are still not suitable for reuse because valid pages cannot be erased. Device garbage collection (GC) is responsible for reclaiming the invalid pages by moving the valid pages into a new block, once the block is free of all valid pages, it is erased, and this block now can be used by incoming writes.

Device GC does not run very frequently, because the GC process will interfere with the device throughput. Out of many blocks, which have many invalid pages, only certain blocks (victim blocks) are picked by the Garbage Collection process for cleanup. Identifying victim blocks is usually done if the block has maximum number of invalid pages. Because of all these thresholds and limitations, the actual amount of physical information written is a multiple of the logical amount intended to be written. Therefore write implication caused by Device GC=(Data written to Flash/Actual Data written by host)

Certain object storing applications, such as level DB and rocks DB, are designed as log-structured merge-tree (LSM) systems. Similar to SSDs (solid state drive), these applications have many invalid versions of objects that are no longer required. A process called compaction is run often, which will compact the database by removing invalid versions of objects. These applications running on SSDs will likewise create write amplification by storing invalid objects. The WA caused by the database is (Data written to Flash/Actual data written to database). The total WA of system is therefore WA of the flash drive times the WA of the database.

The apparatus and methods disclosed herein provide an improved approach for avoiding write amplification in flash storage systems.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
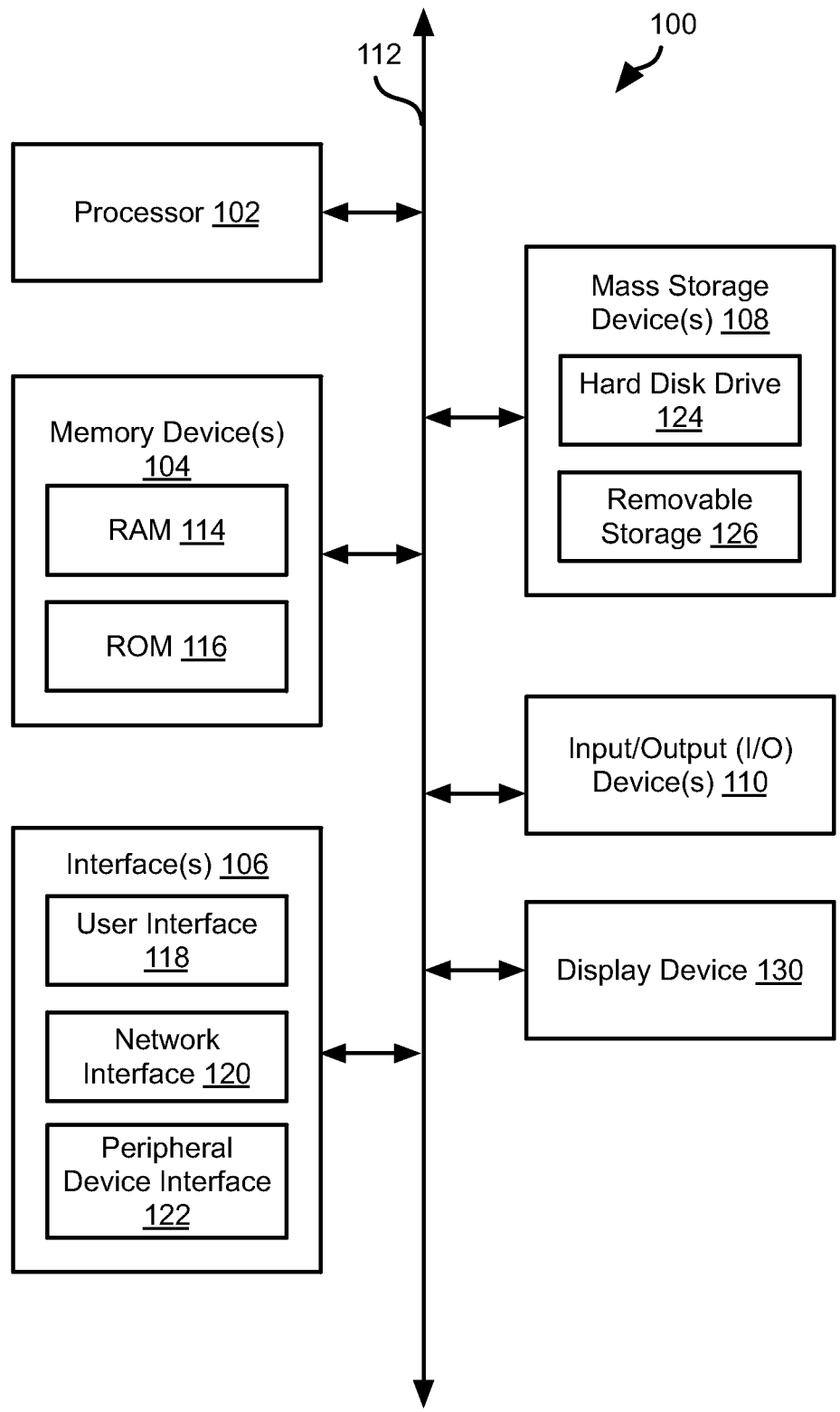
FIG. 1 is a schematic block diagram of a computing system suitable for implementing methods in accordance with embodiments of the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a block diagram illustrating an example computing device 100. Computing device 100 may be used to perform various procedures, such as those discussed herein. Computing device 100 can function as a server, a client, or any other computing entity. Computing device can perform various monitoring functions as discussed herein, and can execute one or more application programs, such as the application programs described herein. Computing device 100 can be any of a wide variety of computing devices, such as a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer-readable media, such as cache memory.

Memory device(s) 104 include various computer-readable media, such as volatile memory (e.g., random access memory (RAM) 114) and/or nonvolatile memory (e.g., read-only memory (ROM) 116). memory device(s) 104 may also include rewritable ROM, such as flash memory.

Mass storage device(s) 108 include various computer readable media, such as magnetic tapes, magnetic disks, optical disks, solid-state memory (e.g., flash memory), and so forth. As shown in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, microphones, monitors or other display devices, speakers, printers, network interface cards, modems, lenses, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments. Example interface(s) 106 include any number of different network interfaces 120, such as interfaces to local area networks (LANs), wide area networks (WANs), wireless networks, and the Internet. Other interface(s) include user interface 118 and peripheral device interface 122. The interface(s) 106 may also include one or more user interface elements 118. The interface(s) 106 may also include one or more peripheral interfaces such as interfaces for printers, pointing devices (mice, track pad, etc.), keyboards, and the like.

Bus 112 allows processor(s) 102, memory device(s) 104, interface(s) 106, mass storage device(s) 108, and I/O device (s) 110 to communicate with one another, as well as other devices or components coupled to bus 112. Bus 112 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 100, and are executed by processor(s) 102. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 2:
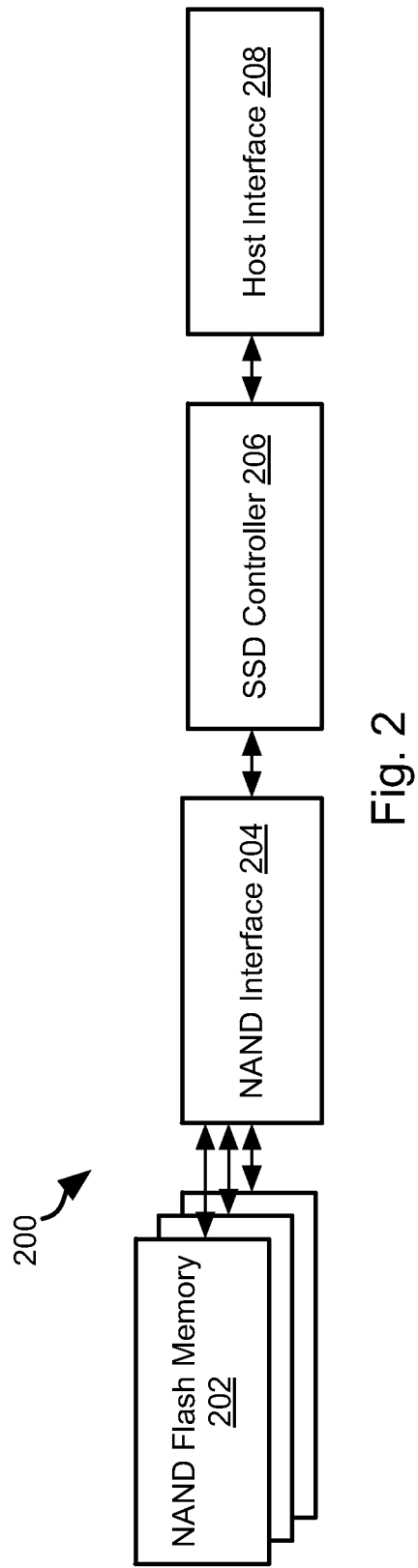
FIG. 2 is a schematic block diagram of a components of a storage system in accordance with the prior art.

Referring to FIG. 2, a typically flash storage system 200 includes a solid state drive (SSD) may include a plurality of NAND flash memory devices 202. One or more NAND devices 202 may interface with a NAND interface 204 that interacts with an SSD controller 206. The SSD controller 206 may receive read and write instructions from a host interface 208 implemented on or for a host device, such as a device including some or all of the attributes of the computing device 100. The host interface 208 may be a data bus, memory controller, or other components of an input/output system of a computing device, such as the computing device 100 of FIG. 1. In a conventional system, garbage collection is performed by the NAND interface 204 or SSD controller 206. As noted above, this results in write amplification both due to garbage collection and database management functions.

Figure 3:
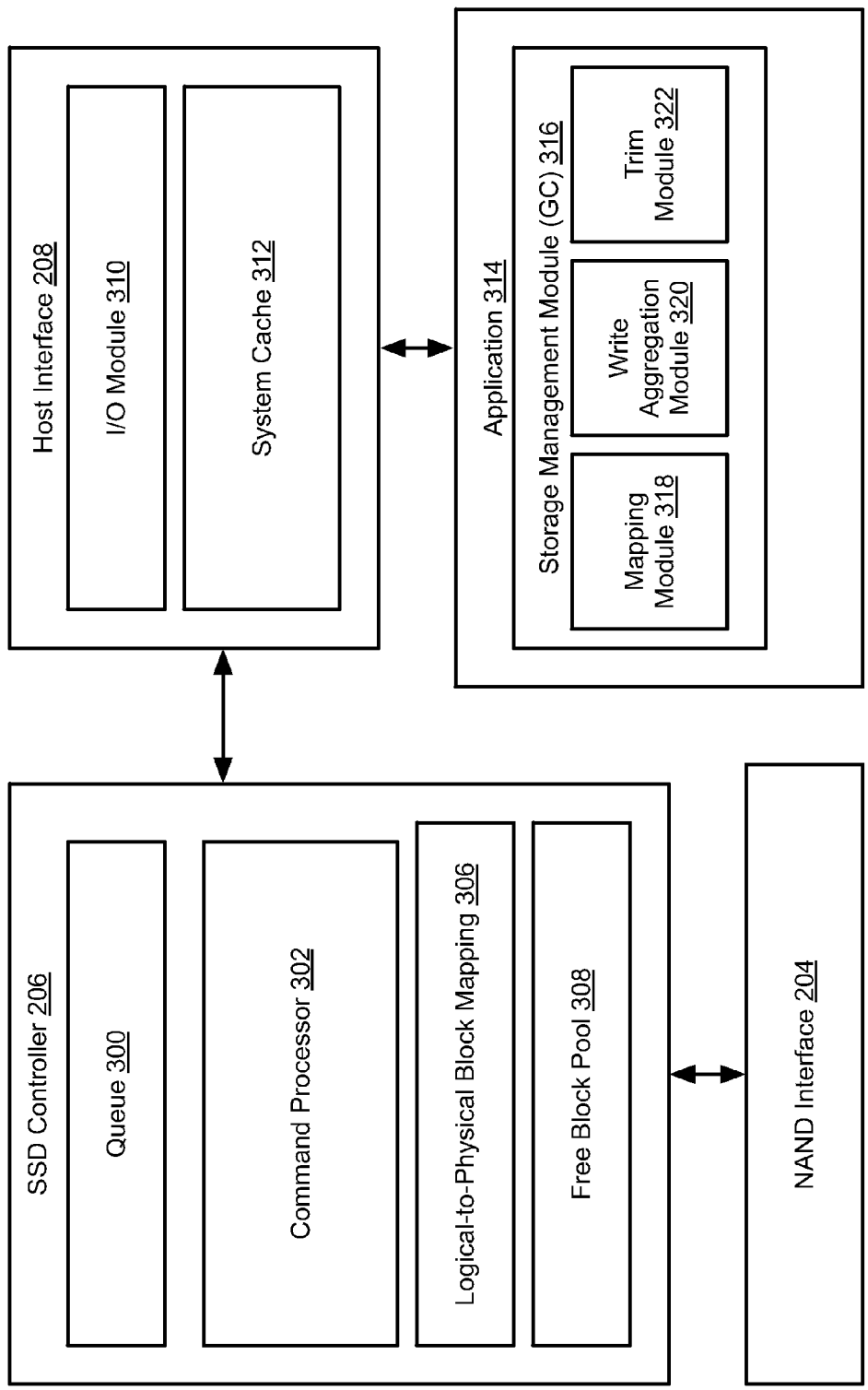
FIG. 3 is a schematic block diagram of a storage system in accordance with an embodiment of the present invention.

FIG. 3 illustrates an improved storage system in accordance with an embodiment of the invention. In particular, the SSD controller 206 may be greatly simplified relative to those of the prior-art. The SSD controller 206 may include conventional components such as a queue 300 for storing instructions from a host system, a command processor 302 that retrieves commands from the queue 300 and executes them through the NAND interface 204 in a conventional manner.

In the illustrated embodiment, the SSD controller 206 retains a logical-to-physical block mapping 306 and a free block pool 308. The SSD controller 206 may assign a logical block identifiers to blocks of memory within the NAND flash memory 202. Accordingly, the SSD controller 206 may store a logical-to-physical block mapping 306 that maps each logical block identifier to a physical block identifier, i.e. an address of the physical block in the NAND flash memory 202.

The SSD controller 206 may also maintain a free block pool 308. In particular, after a block of memory has been erased, a reference to that block of memory (e.g. a logical identifier or physical address) may be added to the free block pool 308. Upon receiving a write instruction, an entry will be deleted from the free block pool 308 by the SSD controller 206 and the block of data in the write instruction will then be written to the NAND flash memory 202 at the block of memory referenced by the deleted entry.

The SSD controller 206 may receive instructions from the host interface 208. The host interface 208 may include an input/output (I/O) module 310 and a cache 312. The cache 312 may buffer instructions from one or more applications and the I/O module 310 may submit these instructions to the SSD controller 206, receive responses to instructions (e.g., acknowledgments of write operations, data read in response to read operations, etc.).

Applications that access the NAND flash memory 202 may have some or all of the functionality of an application 314. The application 314 may advantageously be a database application. As noted above, many database applications have significant write amplification. Accordingly, the elimination of write amplification at the SSD controller 206, as provided by the systems and methods disclosed herein, is particularly helpful in improving the performance of database applications.

The application 314 may be an application that is read from memory and executed by a central processing unit, or set of processing units, of a computer system. The application 314 is not firmware, part of the basic input output system (BIOS), part of the firmware executed by the SSD controller 206 or other device interposed between the a central processing unit of a host system and the NAND flash memory 202. The application 314 may define a user interface for receiving user instructions and outputting information to a user (e.g. on a display 130). The application 314 may define a graphical user interface programmed to receive inputs and render an interface including user interface element and presenting information to a user.

The application 314 may include a storage management module 316. The storage management module may include a mapping module 318. The mapping module 318 may map data objects within the application to logical blocks where the data objects are stored, i.e. the logical block corresponding to a physical memory block where the data objects are stored. However, the mapping module 318 preferably does not maintain the mapping of the logical memory block to a corresponding physical memory block. Likewise, the mapping module may map pages of data to pages of memory within the logical block, such as in the form of an offset within the logical block. Accordingly, read and write operations referencing a page or other data object may be mapped by the mapping module 318 to a location within a logical block. The mapping module 318 may then output, for each read and write operation, a corresponding read and write operation that references the logical block and location within the logical block. The corresponding read and write operations may then be input to the SSD controller 206, such as by way of the host interface 208.

The storage management module 316 may include a write aggregation module 320. In some embodiments, writes are only performed for entire blocks of data. Accordingly, the write aggregation module 320 may aggregate write commands invoked by the application 314 during executing thereof, each write command including a data object. The write aggregation module 320 may aggregate write commands until the data objects of the aggregated write commands are sufficient to fill at least one block of data. At that point, the write aggregation module 322 may then issue a write command to the SSD controller 206, the write command including the data objects of the aggregated write commands sufficient to occupy an entire block of memory.

The storage management module 316 may include a trim module 322. The trim module 322 may detect instructions to delete data objects during execution of the application 314. The trim module 322 may store the references to deleted objects, i.e. an entry that indicates that a deleted object is invalid. Once all the objects in a block of memory, e.g. a block of memory corresponding to a logical block identifier, are determined to be invalid, the trim module 322 may then transmit a trim command referencing that logical block identifier. The trim command instructs the SSD controller 206 to erase the physical block of memory referenced by the logical block identifier. The SSD controller 206 may queue trim commands and execute them according to an algorithm that interleaves trim commands with more urgent read and write commands in order to improve throughput of the SSD controller 206.

Figure 4:
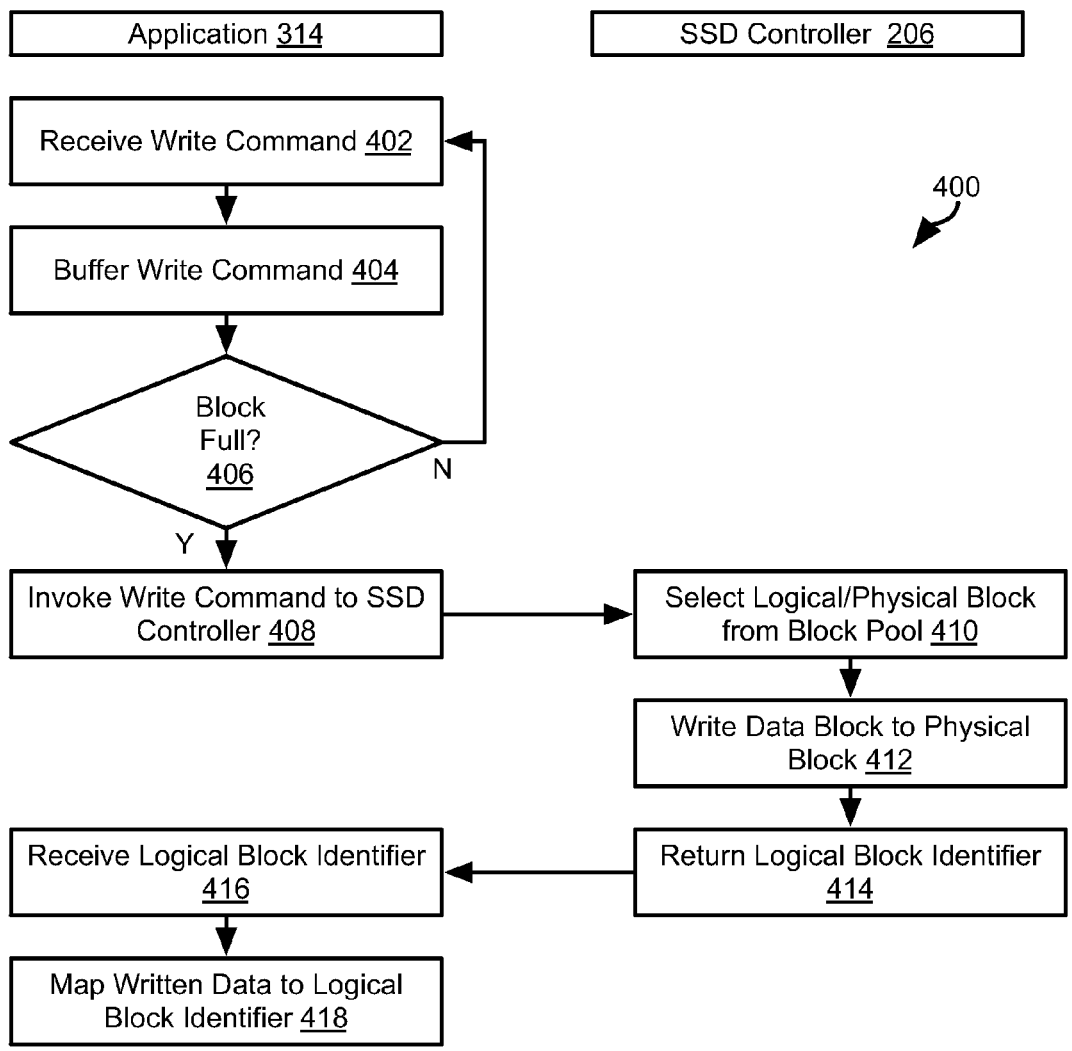
FIG. 4 is a process flow diagram of a method for performing write operations in accordance with an embodiment of the present invention.

FIG. 4 illustrates a method 400 that may be executed by an application 314 and an SSD controller 206. The method 400 may include receiving 402 a write command. The write command may be invoked by the application 314, i.e. some component, function, or module of the application 314 and received by the storage management module 316. The application 314 buffers 404 the write command, such as by creating an entry describing the write command in a buffer. The entry may include the data to be written, i.e. a page or other data object, and a reference to the function or module that invoked the write command. The method 400 may include evaluating 406 whether the buffer includes write commands for data objects sufficient to occupy at least an entire block of memory. If not, then the method continues at step 402 with the receipt of a subsequent write command.

If the buffer is found to include write commands for data objects sufficient to occupy an entire block of memory, then at step 408 the application 314 invokes a write command to the SSD controller 206, the write command including the data objects of the write commands in the buffer. The write command may include a single write command including all of the data objects in the write command or may include a collection of individual write commands.

In response to receiving the write command invoked at step 408, such as by way of the host interface 208, the SSD controller 206 may select 410 a block of memory from the free block pool 308. The free blocks of memory may be referenced in the pool 308 using logical or physical block identifiers. In either case, the data of the write command from step 408 is written 412 to the physical block of memory corresponding to the logical or physical block identifier selected at step 410. Writing 412 the data to the physical block may include encoding the data (e.g. using error correction code (ECC) encoding) and the encoded data is then written 412.

The logical block identifier corresponding to the physical block of memory may then be returned 414 to the application 314, which receives 416 the logical block identifier and maps 418 the data of the write command to that logical block identifier. In particular, the data objects included in the write commands received at step 402 are mapped 418 by the application 314 to the logical block identifier received at step 416. For example, a variable name or other reference to each data object may be mapped 418 to the logical block identifier and possibly an offset within the block of memory referenced by the logical block identifier at which the each data object is stored. The offset at which data objects are stored within the block of memory may be returned by the SSD controller 206 or determined by the application 314, i.e. from the ordering of the data objects in the write command sent at step 408.

Figure 5:
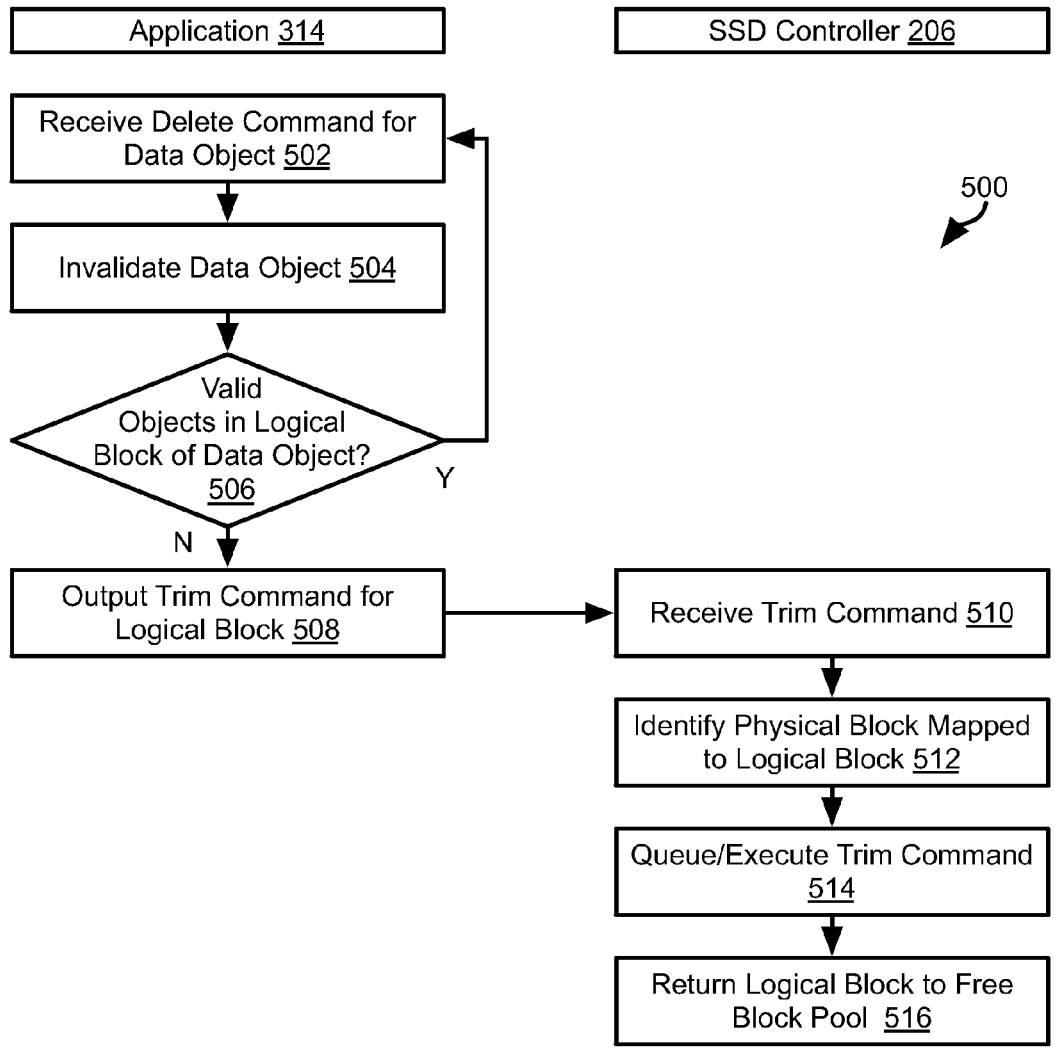
FIG. 5 is a process flow diagram of a method for deleting blocks of data in accordance with an embodiment of the present invention.

Referring to FIG. 5, the illustrated method 500 may be executed by the application 314 and the SSD controller 206 in order to erase blocks of memory. The method 500 may include receiving 502 a command to delete or otherwise invalidate a data object (hereinafter "the deleted data object"). The delete command may be invoked by the application 314, i.e. some component, function, or module of the application 314 and received by the storage management module 316. In response to the command received at step 502, the data object referenced in the command is invalidated 504. For example, in a map of data objects to logical block identifiers and locations within memory blocks corresponding to logical block identifiers, a flag may be set in the mapping of the deleted data object to indicate that the deleted data object is invalid.

The method 500 may include evaluating 506 whether the logical block identifier to which the data object is mapped contains any valid data objects. If so, then the method may continue at step 502 with the receipt of another delete command. If the logical block identifier is found 506 not to have any valid data objects mapped thereto, then the method 500 may include outputting 508 a trim command referencing that logical block identifier. The trim command may be output to the SSD controller 206, such as by way of the host interface 208.

Upon receiving the trim command 510, the SSD controller 206 may identify the physical block identifier corresponding to the logical block identifier in the trim command. A trim command referencing that physical block identifier may then be queued and eventually executed 514 by the SSD controller 206. As noted above, when the trim command is executed may be determined by a prioritization algorithm that prioritizes among read and write commands and any pending trim commands. Upon erasing the physical block of memory corresponding to the logical block identifier, the physical block of memory is returned 516 to the free block pool 308, i.e. a physical or logical block identifier referencing the erased block of memory is added to the free block pool 308.

As is apparent in FIG. 5, the SSD controller 206 performs no garbage collection in order to erase a physical block of memory. In some embodiments, the application 314 may perform garbage collection by moving valid data objects from a logical block such that the logical block no longer contains any valid data objects and can be referenced in a trim command. For example, logical blocks may be identified by the application 314 as containing a number of valid data objects below a threshold, or a number of invalid objects above a threshold, and, in response, move the valid objects to a new logical block and invoke a trim command for the identified logical blocks.

Removing garbage collection from the functionality of the SSD controller 206 improves the performance of the SSD controller 206, particularly the throughput thereof. In prior SSD controllers many optimizations are performed to manage garbage collection in order improve performance of the device and extends its lifetime. By removing garbage collection from the SSD controller 206, the need for these complex processes is eliminated thereby improving performance.

Figure 6:
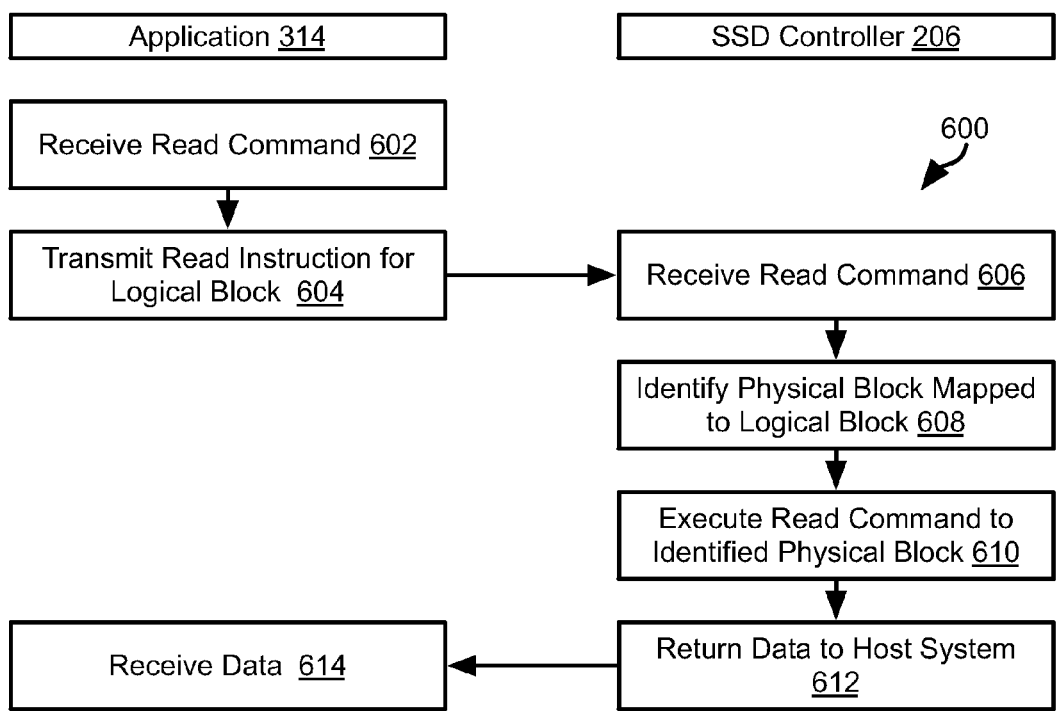
FIG. 6 is a process flow diagram of a method for executing read operations in accordance with an embodiment of the present invention.

Referring to FIG. 6, the illustrated method 600 may be executed by the application 314 and the SSD controller 206 in order to read data from the NAND flash memory. The method 600 may include receiving 600 a read command referencing a data object (hereinafter "the read data object"). The read command may be invoked by the application 314, i.e. some component, function, or module of the application 314 and received by the storage management module 316. In response to the read command received at step 602, the application 314 transmits 604 a read command referencing the read data object. For example, the application 314 may use the mapping module 318 to identify a logical block identifier and offset within the logical block identifier corresponding to the data object. The application 314 may then transmit a read instruction referencing that logical block identifier and offset to the SSD controller 206, such as by way of the host interface 208.

The SSD controller 206 receives 606 the read command transmitted at step 604 and identifies 608 a physical block of memory references by the logical block identifier of the read command. The SSD controller 206 then executes 610 a read command with respect to the NAND flash memory 202 to retrieve the data object at the offset included in the read command and returns 612 the data object to the application 314. Executing 610 the read command may include reading encoded data from the location referenced in the read command and decoding the encoded data to obtain the stored data. Decoding the encoded data may include decoding ECC encoded data such that errors that may have occurred are corrected using information in the encoded data such as using any ECC scheme known in the art. The application 314 receives 614 the read data and returns it to the component, function, module, or other entity of the application that invoked the read command at step 602.

The present invention may be embodied in other specific forms without departing from its spirit or essential characteristics. The described embodiments are to be considered in all respects only as illustrative, and not restrictive. In particular, although the methods are described with respect to a NAND flash SSD, other SSD devices or non-volatile storage devices such as hard disk drives may also benefit from the methods disclosed herein. The scope of the invention is, therefore, indicated by the appended claims, rather than by the foregoing description. All changes which come within the meaning and range of equivalency of the claims are to be embraced within their scope.

What is claimed is:

1. An apparatus comprising:
   a storage device including a non-volatile storage medium defining a plurality of memory blocks; and
   a memory controller device programmed to:
      execute read commands by retrieving a data object referenced in each read command of the read commands from the storage device;
      execute write commands by writing a block of data in each write command of the write commands to a memory block of the plurality of memory blocks;
   a host computer system executing two or more applications by means of a processing device, wherein the applications are not part of firmware, part of a basic input output system (BIOS) of the host computer system, part of firmware executed by the memory controller or by any other device interposed between the processing device and the non-volatile storage medium, the host computer system in data communication with the memory controller device;
   wherein each application of the one or more applications includes executable code effective to cause the host computer system to—
   detect deletion of a deleted data object during execution of the application;
   flag as invalid the deleted data object; and
   if a memory block of the plurality of memory block storing the deleted data object contains only data objects marked as invalid, transmit an instruction to the memory controller device to erase the memory block of the plurality of memory block storing the deleted data object.

2. The apparatus of claim 1, wherein the memory controller is not programmed to track validity of data objects stored in the plurality of memory blocks and does not perform garbage collection with respect to the plurality of memory blocks.

3. The apparatus of claim 1, wherein each application of the two or more a applications further includes executable code effective to cause the host computer system to transmit the instruction to the memory controller to erase the memory block of the plurality of memory blocks storing the deleted data object by:
   transmitting a virtual block identifier to the memory controller, the virtual block identifier corresponding to the memory block of the plurality of memory blocks storing the deleted data object; and
   wherein the memory controller is further programmed to map the virtual block identifier corresponding to the virtual block identifier to a physical block identifier and erase the memory block of the plurality of memory blocks identified by the physical block identifier.

4. The apparatus of claim 1, wherein the memory controller device is further configured to:
   receive the instruction to erase the memory block of the plurality of memory blocks storing the deleted data object; and
   in response to the instruction to erase the memory block, add a reference to the memory block of the plurality of memory blocks storing the deleted data object to a free block pool.

5. The apparatus of claim 4, wherein each application of the two or more applications further includes executable code effective to cause the host computer system to:
   detect an instruction to write a block of data during execution of the each application;
   in response to the instruction to write the block of data, remove, from the free block pool, a selected reference to one memory block of the plurality of memory blocks from the free block pool; and
   transmit, to the memory controller, an instruction to write the block of data to the storage device, the instruction to write the block of data including the selected reference.

6. The apparatus of claim 5, wherein each application of the two or more applications further includes executable code effective to cause the host computer system to:
   detect an instruction to write data objects;
   for each instruction to write one of the data objects—
      store the one of the data objects in a buffer;
      if the buffer stores a full block of data objects, generate the instruction to write the block of data, the block of data including the full block of data objects in the buffer.

7. The apparatus of claim 1, wherein the host computer system includes a central processing device configured to retrieve the executable code of the two or more applications and execute the executable code.

8. The apparatus of claim 7, wherein the executable code of each application of the two or more applications defines a user interface and is further effective to cause the central processing device to render the user interface, receive user inputs from the user interface, and process the user inputs from the user interface.

9. The apparatus of claim 1, wherein the storage device is a NAND flash device.

10. An method comprising:
    providing a storage device including a non-volatile storage medium defining a plurality of memory blocks; and
    providing a memory controller device programmed to:
       execute read commands by retrieving a data object referenced in each read command of the read commands from the storage device;
       execute write commands by writing a block of data in each write command of the write commands to a memory block of the plurality of memory blocks;
    providing a host computer system executing an application, the host computer system in data communication with the memory controller device;
    executing, by the host computer system, two or more applications by a processing device of the host computer system, the two more applications not executing as part of firmware, part of a basic input output system (BIOS) of the host computer system, part of firmware executed by the memory controller or by any other device interposed between the processing device and the non-volatile storage medium, the executing each application of the two or more applications comprising—
       detecting deletion of a deleted data object;
       flagging as invalid the deleted data object; and
       determining that a storing memory block of the plurality of memory block storing the deleted data object contains only data objects marked as invalid;
       in response to determining that the storing memory block contains only data objects marked as invalid, transmitting an instruction to the memory controller device to erase the storing memory block.

11. The method of claim 10, further comprising refraining from tracking, by the memory controller device and the storage device, validity of data objects stored in the plurality of memory blocks and from performing garbage collection with respect to the plurality of memory blocks.

12. The method of claim 10, wherein transmitting the instruction to the memory controller to erase the storing memory block comprises:
   transmitting a virtual block identifier to the memory controller, the virtual block identifier corresponding to the storing memory block; and
   mapping, by the memory controller device, the virtual block identifier corresponding to the virtual block identifier to a physical block identifier; and
   erasing, by the memory controller device, the memory block of the plurality of memory blocks identified by the physical block identifier.

13. The method of claim 10, further comprising:
   receiving, by the memory controller device, the instruction to erase the memory block of the plurality of memory blocks storing the deleted data object; and
   in response to the instruction to erase the memory block, adding, by the memory controller device, a reference to the memory block of the plurality of memory blocks storing the deleted data object to a free block pool.

14. The method of claim 13, further comprising:
   detecting, by each application of the two or more applications, an instruction to write a block of data during execution of the application;
   in response to the instruction to write the block of data, removing, by the each application, from the free block pool, a selected reference to one memory block of the plurality of memory blocks from the free block pool; and
   transmitting, by the each application, to the memory controller, an instruction to write the block of data to the storage device, the instruction to write the block of data including the selected reference.

15. The method of claim 14, further comprising:
   detecting, by each application of the two or more applications, an instruction to write a data object;
   storing, by the each application, the one of the data object in a buffer;
   determining, by the each application, that the buffer stores a block of data;
   generating, by the each application, the instruction to write the block of data, the block of data including the full block of data objects in the buffer.

16. The method of claim 10, further comprising retrieving and executing the two or more application using the processing device.

17. The method of claim 16, wherein the two or more applications further include executable code defining a graphical user interface, the method further comprising, executing each application of the two or more applications by the processing device effective to render the user interface of the each application, receiving user inputs from the user interface, and processing the user inputs from the user interface.

18. The method of claim 10, wherein the storage device is a NAND flash device.

* * * * *